Oct. 12, 1965     S. G. SIDDALL     3,211,467
FRONT AND REAR WHEEL STEERING TRAILER
Filed Feb. 10, 1964
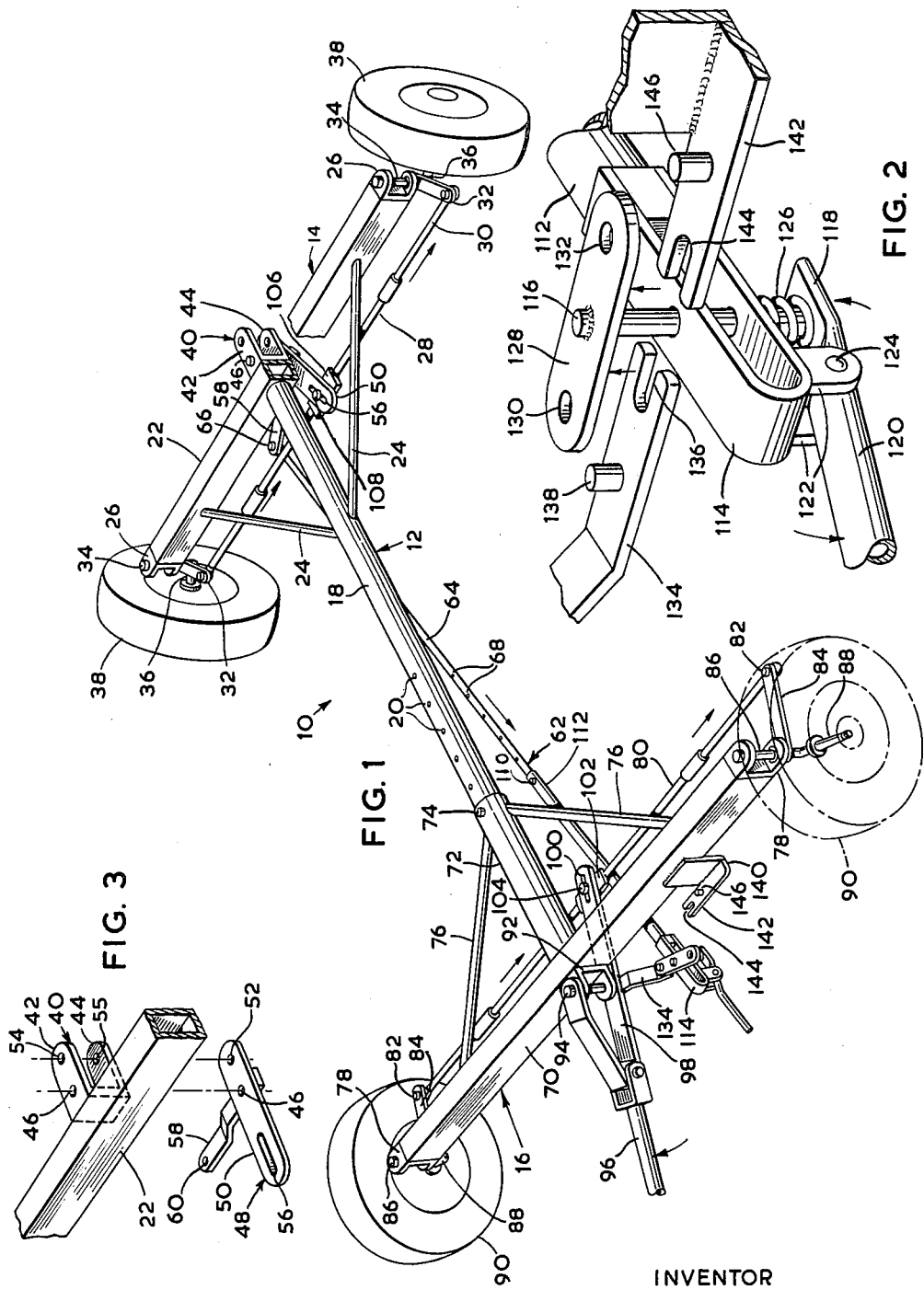
INVENTOR
STANLEY G. SIDDALL
BY- *Frederick E. Bromley*
ATTORNEY

United States Patent Office 3,211,467
Patented Oct. 12, 1965

3,211,467
FRONT AND REAR WHEEL STEERING TRAILER
Stanley G. Siddall, Box 368, Orangeville,
Ontario, Canada
Filed Feb. 10, 1964, Ser. No. 343,848
4 Claims. (Cl. 280—99)

This invention relates generally to trailers, and more particularly to the steering mechanism which optionally provides both front and rear wheel steering.

It is highly desirable, particularly in farm trailers, to have a steering assembly which has a relatively short turning radius particularly when a train of trailers is drawn between relatively close buildings. Further, when pulling a trailer at relatively high speeds over a highway, the vehicle must be relatively stable and generally a two wheel steering is most desirable. At times, it is desirable to have a non-steering vehicle.

A primary object of the present invention is to provide readily convertible two, four and non-steering wheel trailer including novel means for accomplishing the conversion.

Another object of the present invention is to provide a novel trailer hitch facilitating the conversion from a two or four wheel as well as a non-steering system on a trailer.

Other and more specific objects and advantages of the invention will become apparent from the following description when taken in conjunction with the accompanying drawings forming a part thereof, wherein:

In the drawings:

FIGURE 1 is a perspective view of a trailer having a novel steering assembly showing the front and rear wheels coupled for simultaneous turning, the near front wheel being shown in phantom lines for purposes of clarity;

FIGURE 2 is an enlarged fragmentary perspective view showing details of the hitch coupling; and FIGURE 3 is an enlarged, exploded perspective view of a supplemental lock on the steering assembly of the invention.

Referring to the drawing in detail, a trailer chassis is indicated generally at 10 and comprises reach 12, a rear axle 14, and a front axle 16.

The reach 12 comprises tube portion 18 transversely apertured at 20 along one end and fixedly secured at the other end to an intermediate portion of an axle member 22. The axle member and tube 18 and 22, respectively, are braced at 24, and the member 22 has at the opposite ends hinge ears or knuckles 26.

Disposed below the axle member 22 is a linearly adjustable tie rod 28 which is pivotally connected at 30 to levers 32 connected to king pin 34 journaled in the pivot ears 26. The levers are integral with stub axles or spindles 36 upon which are journaled wheels 38.

Fixed to the rear of the axle member 22 in alignment with the tube 18 is a hitch bracket 40 for connection to another trailer, and which includes a pair of overlying arms 42, 44 which are transversely apertured. The arms 42, 44 pivotally support at 46 an L-shaped bellcrank 48 including an arm 50 having a terminal aperture 52 alignable with apertures 54, 55 in arms 42, 44, respectively and a lock pin (not shown) of any suitable character may be inserted through the apertures 52, 54, 55 to prevent pivoting of lever 48 for a purpose to be subsequently described. The arm 50 includes a lost-motion slot 56 and a lateral lever 58 is apertured at its terminal end as indicated at 60; see FIGURE 3.

A linearly adjustable connection rod is indicated generally at 62 and comprises a rod 64 pivotally connected by pin 66 in the aperture 60 of lever 58. The rod 64 is transversely apertured at 68.

The front axle 16 includes an axle member 70 which has fixedly secured thereto a rearwardly opening sleeve 72 which is terminally apertured to receive a lock pin or bolt 74 therethrough for adjusting the distance between the axles. The sleeve 72 is braced at 76 and the member 70 includes at opposite ends pivot ear or knuckle elements 78. A linearly adjustable tie rod 80 is pivotally connected at 82 to terminal ends of levers 84 extending radially from king pins 86 journaled in the knuckles 78. The king pins are connected to stub axles or spindles 88 upon which wheels 90 are mounted.

The axle member 70 has extending forwardly therefrom a draft-bar bracket 92 having pivotally mounted at 94, a draft bar 96. The draft bar 96 includes a plate portion 98 having a lost-motion slot 100. The tie rod 80 has a plate element 102 including a pin 104 received in the lost-motion slot 100. As is conventional, when the draft bar 96 is rotated in a horizontal plane, the wheels 90 are turned accordingly. The rear tie rod 28 includes a horizontal plate 106 having a vertical pin 108 received in the lost-motion slot 56 of the lever 50 on the rear axle, and thus when the connecting rod 62 is connected to both tie rods, both the front and rear wheels of the trailer will pivot simultaneously.

The connection rod 62 is connected to rod 64 by means of a fastener 110 a sleeve 112. The forward end of the sleeve 112 has secured thereto a substantially U-shaped bracket 114 through which is journaled a slidable pin 116. The pin 116 has fixed to the lower end thereof the rear end 118 of a forwardly extending lever 120. The bracket 114 includes depending pivot ears 122 pivotally mounting at 124 an intermediate portion of lever 120 for vertical pivotal movement as indicated in FIGURE 2. A compression spring 126 is circumposed about the pin 116 between opposed surfaces of the lever end 118 and bracket 114.

When the lever 120 is pivoted downwardly against the pressure of spring 126, the pin 116 will be raised as indicated in FIGURE 2.

The pin 116 has fixedly secured to the upper end thereof a transverse lever or plate 128 which is terminally apertured as indicated at 130 and 132. The plate portion 98 of the draft bar 96 has extending in depending relation from one side thereof an arm 134 having a terminal, slot portion 136 and vertically extending pin 138.

Fixed to the axle member 70 is a plate 140 including a forwardly extending flange 142 having a terminal slot 144 and a vertically extending pin 146.

OPERATION

It will be readily apparent that the plate 128 can be optionally connected by means of apertures 130, 132 to pins 138, 146, respectively. The connection is accomplished by the pivoting of lever 120, and horizontal pivoting of draw bar 96.

The lever 50 can be secured against rotation by dropping a lock pin through aligned apertures 52, 54, 55 at the rear axle, and the rear wheels will not be steerable. At the same time, the plate 128 will be connected to pin 146 so that the connection rod 62 will not interfere with front wheel steering.

It will be appreciated that to effect the connection of plate 128 to pin 146 it is necessary to swing the connection rod 62 outwardly at its forward end in order to bring the hole 132 into register with pin 146 and at the same time to engage pin 116 in slot 144. The spring 126 lowers the plate 128 when the handle 120 is manually released. The pin 146 engages in hole 132 and is releasably retained in engagement by spring 126.

As clearly seen in FIGURE 1, when plate 128 is connected to pin 138, both front and rear steering is available. Further, the connecting rod 62 may be disconnected at 110 and the rear wheels may be locked against steering through apertures 52, 54 and 55 of the lock pin.

Thus there has been disclosed a front and rear steering trailer which fully conforms with the objects of the invention, is extremely versatile, and which can be readily converted for use with the various steering combinations afforded by the novel structure.

It will be obvious to those skilled in the art that various changes may be made without departing from the spirit of the invention and therefore the invention is not limited to what is shown in the drawing or described in the specification, but only as set forth in the appended claims.

What is claimed is:

1. In a trailer having a chassis including a pair of spaced axles including steerable wheels pivotably mounted thereon, tie rods at opposite ends of said chassis connected to said wheels, a draw bar pivotally connected to one of said tie rods and the axle adjacent thereto, a lever pivotally connected to said other axle and the tie rod adjacent thereto, a connecting rod pivotally connected to said lever on a pivotal axis offset from the pivotal connection of said lever to said other axle and other tie rod, said connecting rod including thereon manually-operable, detachable coupling means disposed adjacent said draw bar and the axle upon which said draw bar is pivotally connected, and mounting means on the draw bar and mounting means on the axle upon which said draw bar is pivotally connected, each said mounting means including a portion optionally connectable to said detachable coupling means for optionally providing four wheel steering, two wheel steering and non-steering of the wheels, said connecting rod being pivotal relative to said lever and optionally connectable to either or both of said mounting means.

2. The structure as claimed in claim 1 in which said detachable coupling means comprises a shaft element reciprocably supported adjacent the terminal end of said connecting rod, a plate element secured to said shaft element, said plate element including means detachably connectable to said mounting means on said draw bar means, a spring element operatively connected to said shaft element and normally urging said plate element toward a position to be engaged with said mounting portion, and a lever element intermediately pivoted on said connecting rod and engaged with said shaft element for overcoming the normal pressure exerted by said spring for disengaging said plate element from said draw bar mounting means.

3. The structure as claimed in claim 2 in which each said mounting means comprising a plate which includes an upwardly extending pin element, said plate element including an intermediate aperture portion on opposite sides of said shaft element and engageable on said upwardly extending pin element of the respective plates of said mounting means, said mounting means plates including a bifurcated end embracingly engageable intermediately of said shaft element.

4. The structure as claimed in claim 2 in which said first mentioned lever includes an aperture portion therethrough, said other axle including a plate having an aperture alignable with said first mentioned aperture portion of said lever whereby a lock pin may extend through said aligned apertures for preventing pivoting of said wheels on said other axle.

References Cited by the Examiner
UNITED STATES PATENTS

| | | | |
|---|---|---|---|
| 1,160,499 | 11/15 | Fageol | 280—99 |
| 1,312,788 | 8/19 | Keller | 280—445 |
| 1,328,048 | 1/20 | Knapp | 280—445 X |
| 1,547,542 | 7/25 | Weber | 280—445 |
| 1,925,712 | 9/33 | Campbell | 280—99 |
| 2,029,540 | 2/36 | Porteous. | |
| 2,523,790 | 9/50 | Thiel | 280—103 |
| 2,673,091 | 3/54 | Planalp | 280—103 |
| 2,701,143 | 2/55 | Taylor | 280—99 |
| 2,921,784 | 1/60 | Miller. | |

BENJAMIN HERSH, *Primary Examiner.*

KENNETH H. BETTS, *Examiner.*